(12) United States Patent
Inamori et al.

(10) Patent No.: US 7,797,514 B2
(45) Date of Patent: Sep. 14, 2010

(54) SCALABLE MULTI-THREADED SEQUENCING/SYNCHRONIZING PROCESSOR ARCHITECTURE

(75) Inventors: Shinri Inamori, Kanagawa (JP); Deependra Talla, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 359 days.

(21) Appl. No.: 11/560,370

(22) Filed: Nov. 16, 2006

(65) Prior Publication Data

US 2008/0120489 A1   May 22, 2008

(51) Int. Cl.
*G06F 9/30* (2006.01)
(52) U.S. Cl. .................. 712/214; 712/28; 712/30
(58) Field of Classification Search ............ 712/28, 712/10, 13–15, 30, 214
See application file for complete search history.

(56) References Cited

U.S. PATENT DOCUMENTS

| | | | | |
|---|---|---|---|---|
| 5,546,593 | A * | 8/1996 | Kimura et al. | 712/228 |
| 6,058,466 | A * | 5/2000 | Panwar et al. | 712/15 |
| 6,151,668 | A * | 11/2000 | Pechanek et al. | 712/24 |
| 6,446,191 | B1 * | 9/2002 | Pechanek et al. | 712/24 |
| 7,134,124 | B2 * | 11/2006 | Ohsawa et al. | 718/100 |
| 7,146,489 | B2 * | 12/2006 | Dowling | 712/207 |
| 7,200,741 | B1 * | 4/2007 | Mine | 712/244 |
| 7,243,345 | B2 * | 7/2007 | Ohsawa et al. | 717/149 |
| 7,272,703 | B2 * | 9/2007 | Dowling | 712/225 |
| 7,281,250 | B2 * | 10/2007 | Ohsawa et al. | 718/102 |
| 7,284,092 | B2 * | 10/2007 | Nunamaker et al. | 711/122 |
| 7,350,060 | B2 * | 3/2008 | Floyd | 712/227 |
| 7,496,921 | B2 * | 2/2009 | Mehta | 718/108 |
| 7,518,993 | B1 * | 4/2009 | Dennis | 370/235 |
| 7,631,170 | B2 * | 12/2009 | Dowling | 712/225 |
| 2002/0040429 | A1 * | 4/2002 | Dowling | 712/228 |
| 2002/0091916 | A1 * | 7/2002 | Dowling | 712/228 |
| 2003/0004683 | A1 * | 1/2003 | Nemawarkar | 702/186 |
| 2003/0005266 | A1 * | 1/2003 | Akkary et al. | 712/220 |
| 2003/0014471 | A1 * | 1/2003 | Ohsawa et al. | 709/107 |
| 2003/0014472 | A1 * | 1/2003 | Ohsawa et al. | 709/107 |
| 2003/0014473 | A1 * | 1/2003 | Ohsawa et al. | 709/107 |
| 2003/0188141 | A1 * | 10/2003 | Chaudhry et al. | 712/235 |
| 2004/0073910 | A1 * | 4/2004 | Hokenek et al. | 719/310 |
| 2004/0216102 | A1 * | 10/2004 | Floyd | 718/100 |
| 2005/0289299 | A1 * | 12/2005 | Nunamaker et al. | 711/122 |
| 2007/0088915 | A1 * | 4/2007 | Archambault et al. | 711/137 |
| 2009/0006773 | A1 * | 1/2009 | Yamaguchi et al. | 711/154 |

* cited by examiner

*Primary Examiner*—Aimee J Li
(74) *Attorney, Agent, or Firm*—Robert D. Marshall, Jr.; W. James Brady; Frederick J. Telecky, Jr.

(57) ABSTRACT

A high performance sequencer/synchronizer controls multiple concurrent data processors and dedicated coprocessors and their interaction with multiple shared memories. This sequencer/synchronizer controls multi-threading access to shared memory.

7 Claims, 5 Drawing Sheets

SCALABLE MULTI-THREADED SEQUENCING/SYNCHRONIZING PROCESSOR ARCHITECTURE

TECHNICAL FIELD OF THE INVENTION

The technical field of this invention is multi-threaded data processing.

BACKGROUND OF THE INVENTION

Conventional multi-processor systems employ a micro-sequencer to reduce or eliminate interactions between the central processing unit (CPU) and the coprocessor subsystem during complex algorithms. FIG. 1 illustrates an example architecture of a customized system used for video coding. Micro-sequencer 120 includes sequencer state machine and control block 104, which handles interactions between coprocessors Cop_X 101, COP_Y 102, and direct memory access (DMA) 103. Coprocessor Cop_X 101 and Cop_Y 102 employ four dedicated memory blocks: command memory_1 105; command memory_2 106; quantization memory 107; and Huffman memory 108. Sequencer state machine and control block 104 executes commands read from sequencer command memory 109. CPU 100 passes sequencer commands via bus interface 110 and coprocessor bus 112 to the sequencer command memory 109. Micro-sequencer 120 interacts with coprocessors Cop_X 101, Cop_Y 102 and DMA 103 and their processing on shared memory A 113 and shared memory B 114. DMA 103 provides direct access to SDRAM external memory 117 via SDRAM controller 111. Sequencer state machine and control block 104 cannot interact with the other memories, command memory_1 105, command memory_2 106, quantization memory 107, Huffman memory 108 or bitstream buffer 115. CPU 100 has full control of all the programming directing interactions between coprocessors and all memories other than shared memory A 113 and shared memory B 114. The example system of FIG. 1 attempts to offload the compute intensive processing from the CPU 100 to coprocessors Cop_X 101 and Cop_Y 102.

FIG. 2 illustrates an example of a conventional multi-processor sequencer 230. The complexity of sequencer 230 depends on the number of shared memories 210 and the required interaction between processors CPU 200, Proc_2 202, coprocessor Cop_1 211, coprocessor Cop_2 212, DMA 213 and shared memories 210. CPU 200 loads the sequencer command memory 222 via path 224 with instructions for executing sequential operations. Sequencer state machine and control logic 214 coordinates processors allowing collision free use of the co-processor bus 215. Sequencer state machine and control logic 214 provides enable and interrupt signals to the processor and coprocessor elements via path 228. Interrupt requests generated by each processor are passed via path 216 to interrupt controller 217. Task status registers 218 keep track of interrupt requests, cleared interrupts, flags and generate enable and disable commands as required. Interrupts pass to the processor elements via paths 219, 225 and 228. CPU 200 and sequencer state machine and control logic 230 are master elements for bus arbitration within the coprocessor bus 215. All other elements attached to coprocessor bus 215 are slaves. Command decoder 223 decodes commands from the sequencer command memory 222 and passes decoded commands to coprocessor bus 215 via path 228 and then to the destination processor. Path 229 sends a CPU_go command releasing control to the CPU 200.

The multiprocessor system illustrated in FIG. 2 improves the overall throughput of computations performed in comparison to a single processor system but does not provide for the most powerful and efficient use of the available processors and coprocessors. The sequencer is limited to single threaded operations, operations that often must remain sequential because of the limitations of the sequencer to direct a plurality of simultaneous operations.

SUMMARY OF THE INVENTION

The present invention is a sequencer/synchronizer for multiple processors connected in a multi-threaded system. Using multi-threading, many of the processing tasks that would require operations performed by the main processor are off-loaded to the auxiliary processors, greatly increasing system throughput. Multi-threading allows plural processor-intensive tasks to be completed by the auxiliary processors in parallel with operations performed by the main processor, without excessive interrupts of the main processor. Such interrupts would cause heavy drain on system throughput.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
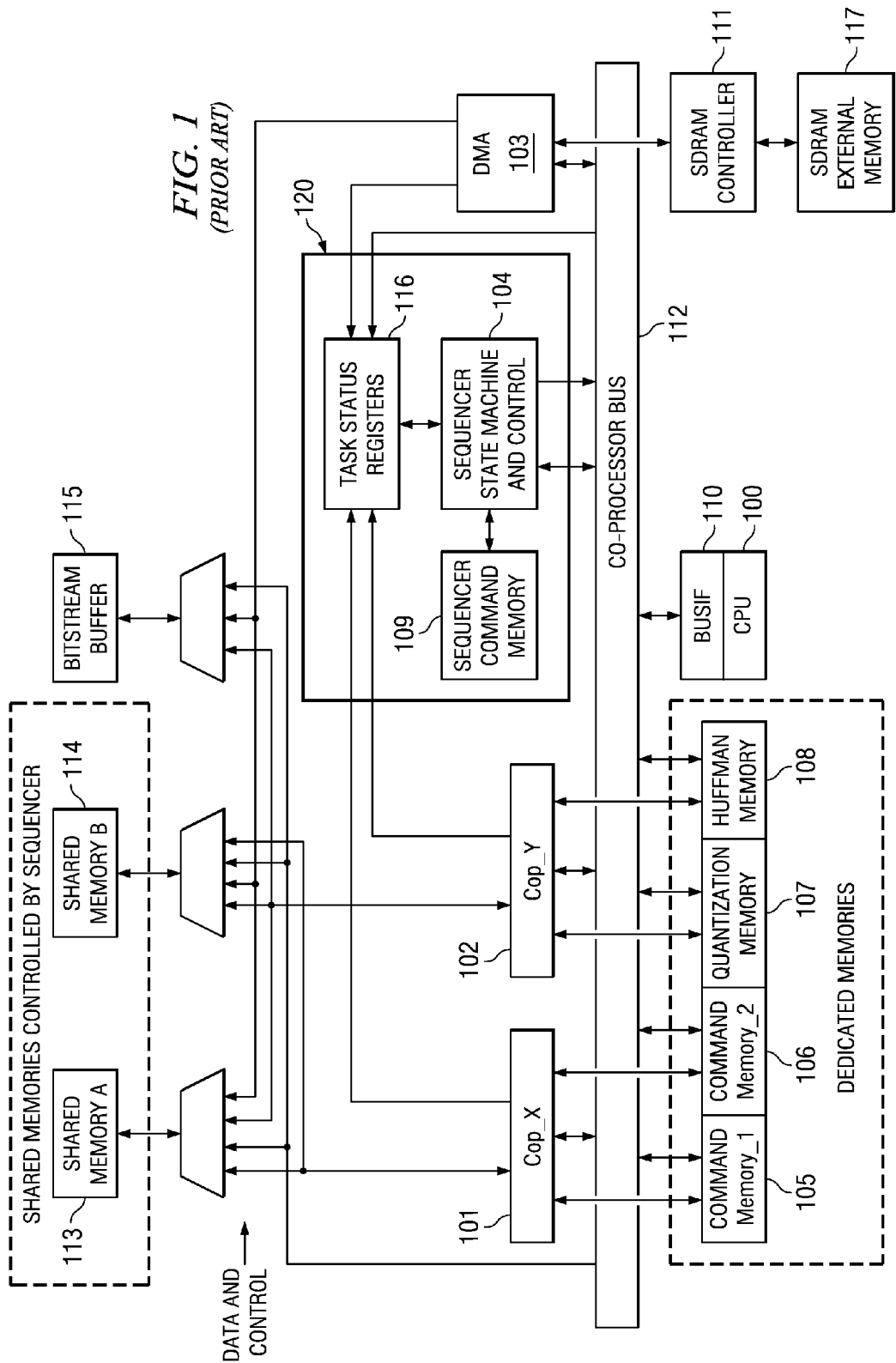
FIG. 1 illustrates the block diagram of a conventional custom multiprocessor system (Prior Art)
Figure 2:
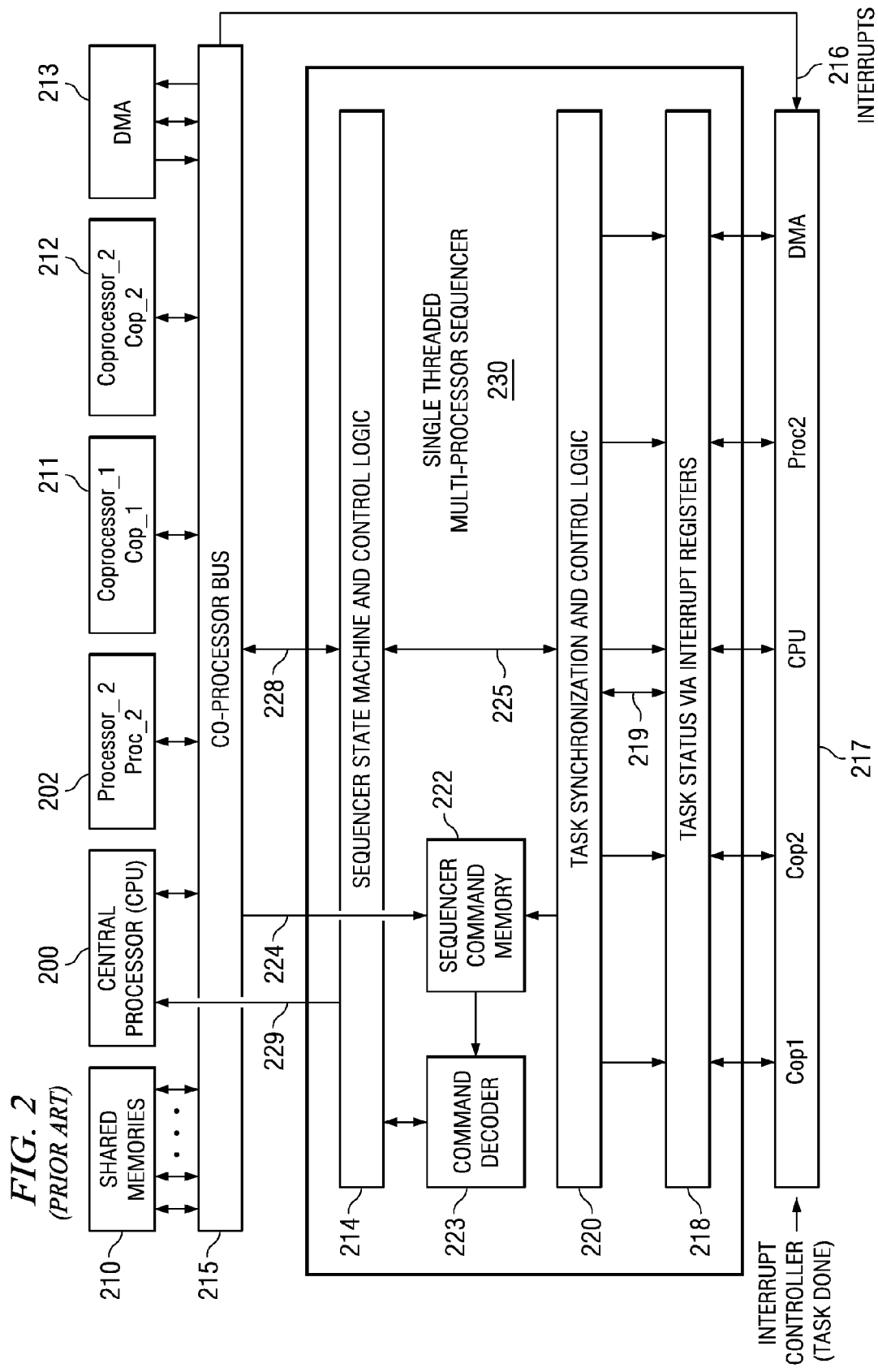
FIG. 2 illustrates the block diagram of a conventional generic multiprocessor system (Prior Art)
Figure 3:
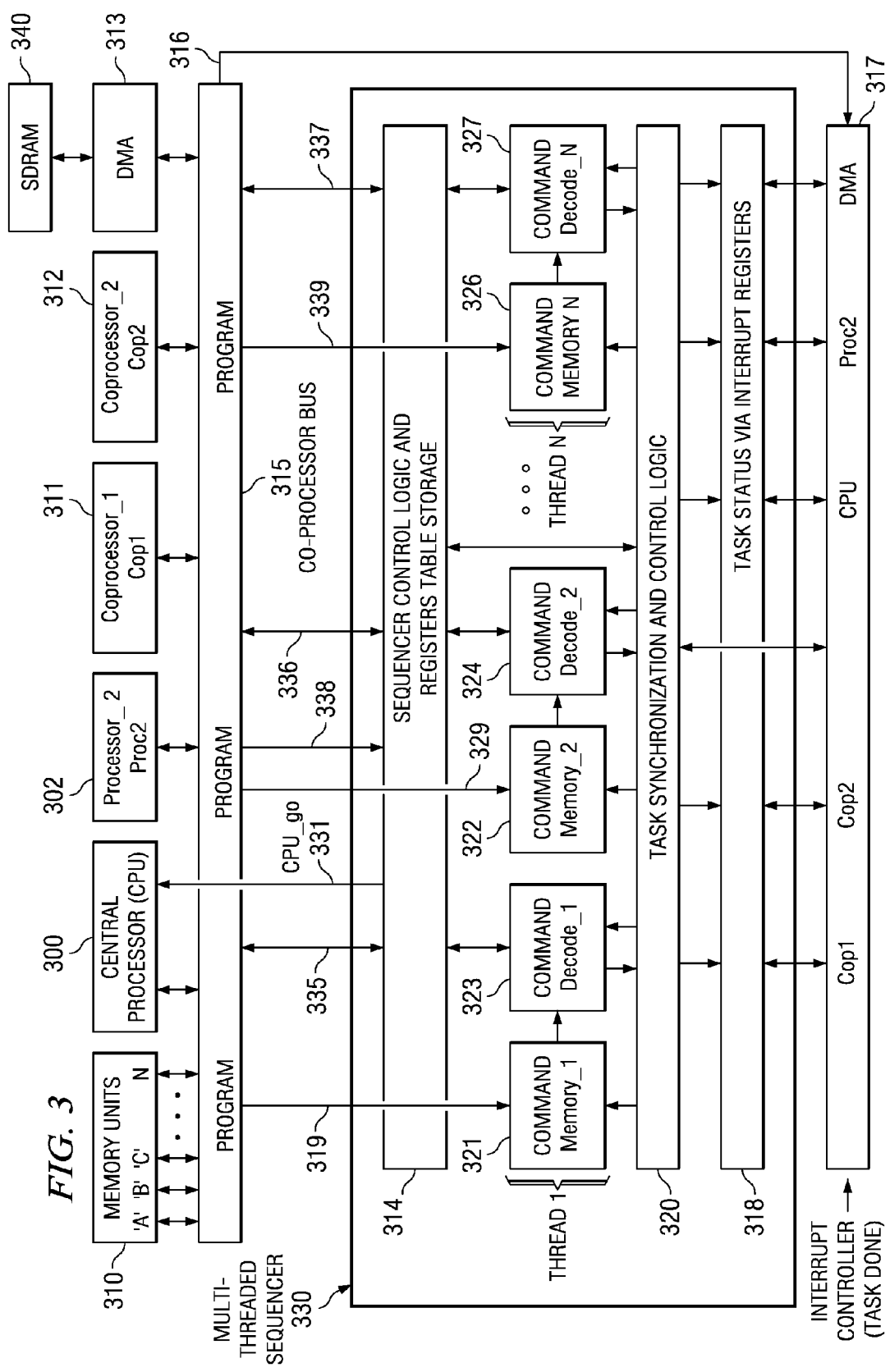
FIG. 3 illustrates a multi-threaded multi-processor system using the sequencer/synchronizer of this invention.

FIG. 3 illustrates the functional block diagram of sequencer/synchronizer 330 for use in a multi-threaded processor system. Sequencer/synchronizer 330 includes a plurality of threads labeled 1 through N. Each thread has a command memory, a command decode block and a sequencer state machine. The command memories are 321, 322, and 326; the command memory decodes are 323, 324, and 327. DMA 303 provides direct access to SDRAM external memory 340. Sequencer control logic and register table storage 314 contains storage for register tables input by CPU 300. CPU 300 passes input to sequencer control logic and register table storage 314 via path 338. Interrupts pass to CPU 300 via path 331.

The optimum system has a number of threads equal to the memory elements being accessed and to the number of processors directed by the sequencer. In the following description the term multi-threaded sequencer refers to sequencer/synchronizer 330. Synchronization is by definition a part of the multi-threaded sequencer function.

Task status registers 318 keep track interrupt requests, cleared interrupts, flags and generate enable and disable commands as required. Interrupt requests generated by each processor are passed via path 316 to interrupt controller 317. Interrupts pass to the processor elements via paths 335, 336 and 337. CPU 300 and the sequencer/synchronizer 330 are master elements for bus arbitration on coprocessor bus 315. All other elements attached on coprocessor bus 315 are slaves. Sequencer command memories 321, 322 and 326 are loaded from coprocessor bus 315 via respective paths 319, 329 and 339. Command decoders 323, 324 and 327 decode commands from respective sequencer command memories 321, 322 and 326. Decoded commands pass to coprocessor bus 315 via respective paths 335, 336 and 337, and then to the receiving processor. Task synchronization and control logic 320 controls all transactions between the task status registers 318, the command decode blocks 323, 324 and 327 and the sequencer control logic and registers table storage 314.

The following commands can be executed by sequencer/synchronizer 330:

1. XXX_START: Signals 'XXX' to start processing. Examples: XXX=Proc2 for processor 2 302; XXX=Cop1 for coprocessor 1 311; XXX=DMA for DMA engine 313.

2. SET_PARA, set parameter: Sets certain 'group YYY' registers. This command may have to be executed multiple times per 'group YYY' depending on the configuration required for 'YYY' setup.

3. SYNC_ON: Synchronizes a receiving thread to a sending thread via the sender SYNC_TO command.

4. SYNC_TO: One thread sends synchronization to a receiving thread via the receiver SYNC_ON command.

5. SWITCH: Selects one shared memory from memory units 310 to engage with one of the processors 302, 311, 312 or 313 for a read or a write.

6. WAIT: Tells sequencer/synchronizer 330 to wait until a previous command completes. For example if sequencer/synchronizer 330 issues XXX_START followed by WAIT, the next command after WAIT is only executed after XXX finishes and returns an interrupt.

7. LOOP: Iterates a sequence of commands based on count set by the LOOP command.

8. CPU_GO: This command shifts control of the processing from sequencer/synchronizer 330 to CPU 300. If Thread 1 contains this command, only control of Thread 1 is given to CPU 300 and Thread 2 commands will continue to be executed by sequencer/synchronizer 330. CPU 300 executes the required code then hands over control to sequencer/synchronizer 330. This allows CPU 300 to operate seamlessly with sequencer/synchronizer 330. Whenever sequencer/synchronizer 330 encounters a CPU_GO command, it generates an interrupt to CPU 300 and sets a register to indicate transfer of control to CPU 300. CPU 300 is responsible for clearing this interrupt when it returns control of that thread to sequencer/synchronizer 330.

Sequencer/synchronizer 330 can accept interrupts from coprocessors Cop1 311, Cop2 312 and DMA 313, and can accept an error interrupt. Each of the three START commands, Cop1_START, Cop2_START, and DMA_START can be conditionally executed based on the task status of any combination of the Cop1, Cop2, and DMA interrupts. For example, if coprocessor Cop2 312 is executing Cop1_START command in Thread 1, then on encountering a Cop1_START command in Thread 2, the command does not issue until the Cop1 command in Thread 1 finishes and sequencer/synchronizer 330 receives a Cop1 interrupt.

Similarly if a Cop1_START is preceded by a DMA_START in the Thread 1 command memory and if this Cop1_START command is specified by the DMA restriction, then this Cop1_START command cannot proceed before the DMA_START finishes and DMA 313 sends an interrupt to sequencer/synchronizer 330. If the same coprocessor START command is executed simultaneously in both threads, the Thread 1 command memory gets priority.

Consider an example high performance video algorithm with three threads. Assume this example employs Proc2 302, Cop1 311, Cop2 312 and DMA 313. These four processing elements use shared memories A, B and C in memory units 310. The input data and output data are both stored in external memory SDRAM 340 accessed by DMA 313.

The conventional way of executing this algorithm uses a general-purpose processor such as CPU 300 of FIG. 3. CPU 300 fetches data from SDRAM 340, processes it then stores results in SDRAM 340. The performance realized in this approach does not meet expectations. A faster way to implement the algorithm employs parallel processing using a combination of Cop1 311, Cop2 312, Proc2 302 a less complex processor than CPU 300 and DMA 313. CPU 300 is free to perform other tasks in the system.

Figure 4A:
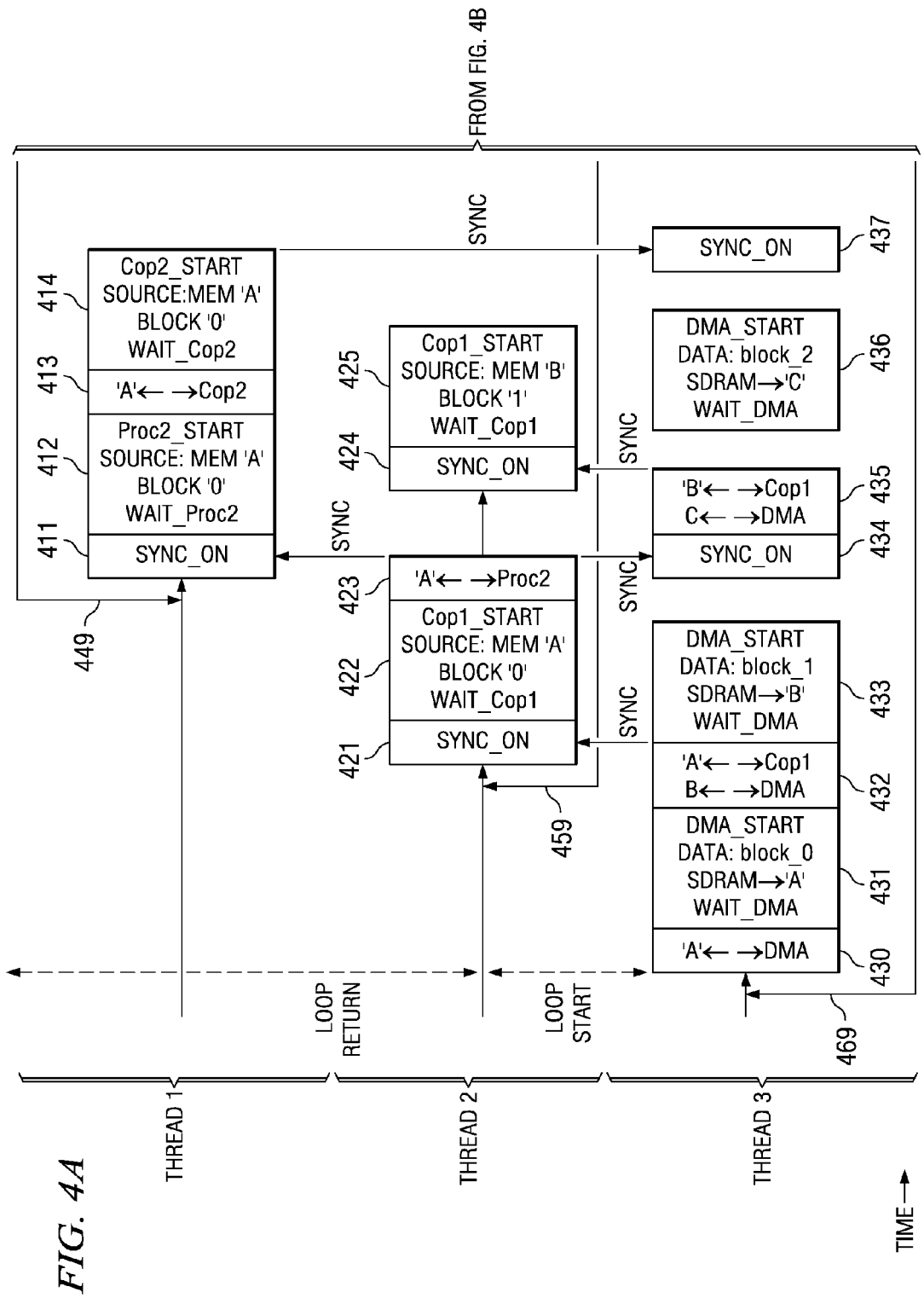
FIGS. 4A and 4B together illustrate the flow for an example compute-intensive video algorithm executed by a multi-threaded processor system using the sequencer/synchronizer of this invention.
Figure 4B:
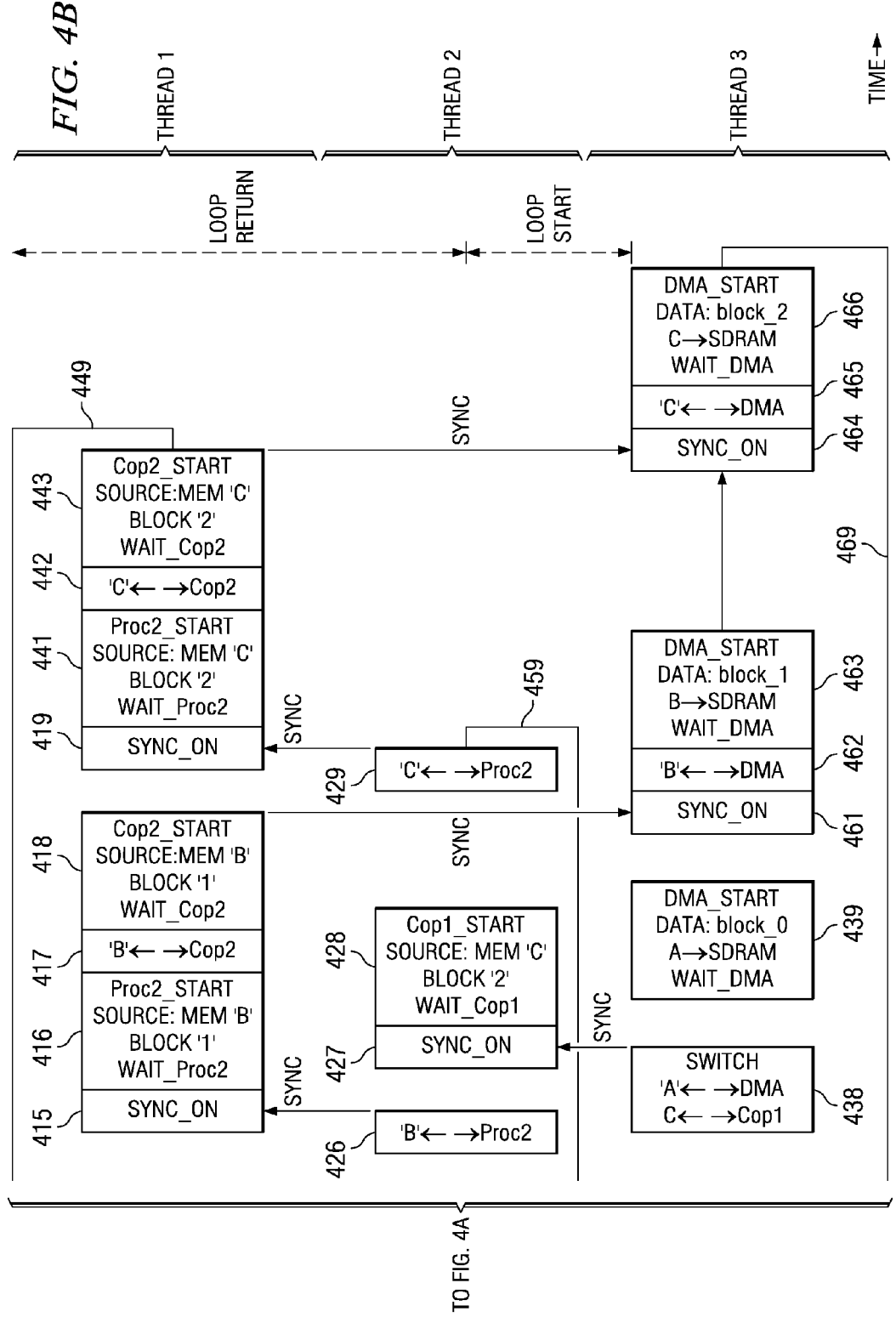

FIG. 4 illustrates the functional behavior of the four processors units performing operations arranged into threads in a multi-threaded system. In this example, Thread 3 provides initial execution and includes all DMA operations. These DMA operations include fetching data from and storing data to SDRAM 340 and utilizing memories A, B and C for intermediate storage. Thread 2 executes all initial data computations on the fetched data using coprocessor Cop1 311. Receiving a sync from Thread 2, Thread 1 completes two additional steps of computation. In Thread 1, Proc2 302 and Cop2 312 are responsible for processing the data passed from Thread 2. After completing the processing on one block of data, Thread 1 sends a sync to Thread 3 where DMA 313 receives the stored data and stores results in SDRAM 340. In the example of FIG. 4, 30 blocks of data are to be processed in succession by repeating the loop illustrated. Ten total loops are required with each loop completing the processing of three blocks of data.

The process blocks of FIG. 4 are as follows:

Thread 3
   430: SWITCH: Connect memory A to DMA.
   431: SET_PARA; DMA_START; DMA fetches block 0 data from SDRAM into memory A; WAIT until DMA done.
   432: SWITCH: Connect Cop1 to memory A; Connect DMA to memory B; SYNC_Thread 3 sends sync to Thread 2.

Thread 2
   421: SYNC_ON: Thread 2 receives sync from Thread 3.
   422: SET_PARA; Cop1_START; Cop1 processes block 0 data from memory A; WAIT until Cop1 done.
   423: SWITCH: Connect Proc_2 to memory A; SYNC_TO: Thread 2 sends syncs to Threads 1 and 3.

Thread 3
   433: SET_PARA; DMA_START; DMA fetches block 1 data from SDRAM into memory B; WAIT until DMA done.

Thread 1
   411: SYNC ON: Thread 1 receives sync from Thread 2.
   412: SET_PARA; Proc2_START; Proc_2 processes block 0 from memory A; WAIT until Proc2 done.
   413: SWITCH: Connect memory A to Cop2.
   414: SET_PARA; Cop2_START; Cop2 processes block 0 from memory A; WAIT until Cop2 done; SYNC_TO: Thread 1 sends sync to Thread 3.

Thread 3
   434: SYNC_ON: Thread 3 receives sync from Thread 2.
   435: SWITCH: Connect memory B to Cop1; Connect memory C to DMA; SYNC_TO: Thread 3 sends sync to Thread 2.

Thread 2
   424: SYNC_ON: Thread 2 receives sync from Thread 3.
   425: SET_PARA; Cop1_START; Cop1 processes block 1 from memory B; WAIT until Cop1 done.
   426: SWITCH: Connect memory B to Proc2; SYNC_TO: Thread 2 sends sync to Thread 1.

Thread 1
  415: SYNC_ON: Thread 1 receives sync from Thread 2.
  416: SET_PARA; Proc2_START; Proc_2 processes block 1 from memory B; WAIT until Proc2 done.
  417: SWITCH: Connect memory B to Cop2.
  418: SET_PARA; Cop2_START; Cop2 processes block 1 from memory B; WAIT until Cop2 done; SYNC_TO: Thread 1 sends sync to Thread 3.
Thread 3
  436: SET_PARA; DMA_START; DMA fetches block 2 data from SDRAM into memory C; WAIT until DMA done.
  437: SYNC_ON: Thread 3 receives sync from Thread 1.
  438: SWITCH: Connect memory C to Cop1; SWITCH: Connect memory A to DMA; SYNC_TO: Thread 3 sends sync to Thread 2.
  439: SET_PARA; DMA_START; DMA stores block 0 data from memory A into SDRAM; WAIT until DMA done.
Thread 2
  427: SYNC_ON: Thread 2 receives sync from Thread 3.
  428: SET_PARA; Cop1_START; Cop1 processes block 2 from memory C; WAIT until Cop1 done.
  429: SWITCH: Connect memory C to Proc2; SYNC_TO: Thread 2 sends sync to Thread 1; Thread 2 returns to step 421 via path 459.
Thread 1
  419: SYNC_ON: Thread 1 receives sync from Thread 2.
  441: SET_PARA; Proc2_START; Proc_2 processes block 2 from memory C; WAIT until Proc2 done.
  442: SWITCH: Connect memory C to Cop2.
  443: SET_PARA; Cop2_START; Cop2 processes block 2 from memory C; WAIT until Cop2 done; SYNC_TO: Thread 1 sends sync to Thread 3; Thread 1 returns to step 411 via path 449.
Thread 3
  461: SYNC_ON: Thread 3 receives sync from Thread 1.
  462: SWITCH: Connect memory B to DMA.
  463: SET_PARA; DMA_START; DMA stores block 1 data from memory B into SDRAM; WAIT until DMA done.
  464: SYNC_ON: Thread 3 receives sync from Thread 1.
  465: SWITCH: Connect memory C to DMA.
  466: SET_PARA; DMA_START; DMA stores block 2 data from memory C into SDRAM; WAIT until DMA done.
  Thread 3 returns to step 430 via path 469.

Using the multi-threading sequencer it is possible to allow parallel operation of Proc2 302, Cop1 311, Cop2 312 and DMA 313. Each processor operates on a different block of data. This is highlighted in steps 416, 428 and 439 where three processors are operating at one time on separate data. Proc1 302 operates on memory B data; Cop1 313 operates on memory C data; and DMA 313 operates on memory A data. This shows three threads of concurrency. The number of shared memories determines the number of threads that may be used for simultaneous processing. While FIG. 4 shows vacant times on the time axis, it should be noted that the individual blocks are not to scale. FIG. 4 shows that the three threads can operate concurrently in a manner that maximizes throughput by minimizing wait requirements.

The following register formats are used to drive command sequences in sequencer/synchronizer 330. These register formats apply to the information stored in Sequencer control logic and register table storage 314 of FIG. 3.

TABLE 1

| Bits | Register Name | Description |
| --- | --- | --- |
| 15:0 | ST_N | Starting address of the sequencer command memory for BufN in 32-bit increments |

Table 1 shows the syntax of N SEQ_Start_N registers. In this invention N is the maximum number of threads. Each SEQ_Start_N register contains the starting address of the command to be executed by that thread. CPU 300 or DMA 313 must place the sequencer program in the command_memory. SEQ_Start_N tells sequencer/synchronizer 330 where in its command memory to start executing. This allows flexibility in sequencer operation rather than always starting from 0 address. Each SEQ_Start_N register is a read/write register.

TABLE 2

| Bits | Register Name | Description |
| --- | --- | --- |
| 15:1 | RSV | Reserved Bits -- Do not use |
| 0 | Abort | Abort the sequencer<br>0: no<br>1: yes |

Table 2 shows the SEQ_Abort register. The SEQ_Abort register is a 1-bit register used as a soft reset of the sequencer by CPU 300. SEQ_Abort is intended for use only when sequencer/syncrhonizer 330 enters an indefinite state. This could occur if sequencer/synchronizer 330 is expecting a sync from another thread, but the other thread never provides the sync. This is useful for software development to recover from error code without shutting off the full system. SEQ_Abort is a read/write register.

TABLE 3

| Bits | Register Name | Description |
| --- | --- | --- |
| 15:1 | RSV | Reserved Bits -- Do not use. |
| 0 | CPU_N | Control of a thread to the CPU processor<br>0: no<br>1: yes |

Table 3 shows each SEQ_CPU_TRANSFER_CONTROL_N register. There are N SEQ_CPU_TRANSFER_CONTROL_N registers. Each SEQ_CPU_TRANSFER_CONTROL_N register includes CPU_N field which is '1' if the sequencer thread N has transferred control to CPU 300 on executing a CPU_go command. The CPU_N field is '0' when sequencer/synchronizer 330 controls the thread. This read-only register is for debugging purposes and software development. CPU 330 cannot write to SEQ_CPU_TRANSFER_CONTROL_N because this register simply conveys status.

What is claimed is:
1. A multiple-thread data processing control device comprising:
   a primary control data processor;
   a plurality of subsidiary data processors;
   a plurality of command memories, each command memory corresponding to one of said multiple threads and storing a sequence of commands for a corresponding thread, said sequence of commands specified by said primary control data processor;

a plurality of command decoders, each command decoder corresponding to one of said multiple threads, connected to a corresponding command memory and decoding said commands stored in said corresponding command memory, each command decoder responsive to a START command specifying one of said plurality of subsidiary data processors to direct following commands in said sequence of commands to said specified one of said plurality of subsidiary data processors;

a sequence control logic unit connected to each command decoder and transmitting decoded commands to corresponding subsidiary data processor under control of said primary control data processor.

2. The multiple-thread data processing control device of claim 1, further comprising:

a subsidiary processor bus connected to said primary control data processor, each subsidiary data processor and said sequence control logic unit, said subsidiary processor bus enabling data movement between said subsidiary data processors and said sequence control logic unit under control of said primary data processor.

3. The multiple-thread data processing control device of claim 2, further comprising:

a plurality of data memory units equal to a number of said multiple-threads, each data memory unit connected to said subsidiary processor bus for independent read/write of data according to commands within a corresponding thread.

4. The multiple-thread data processing control device of claim 2, further comprising:

a plurality of shared data memory units; and said subsidiary data processors includes a direct memory access unit connected between said plurality of shared data memory units and said subsidiary processor bus for read and write data movement between other subsidiary data processors and said shared data memory units under control of one of said plurality of command decoders in response to a START command specifying said direct memory access unit.

5. The multiple-thread data processing control device of claim 4, wherein:

each command decoder is further responsive to a SWITCH command specifying one of said plurality of shared data memories units to enable said subsidiary data processor of a last START command in the corresponding one of said multiple threads to read from and write to said specified one of said plurality of shared data memories.

6. The multiple-thread data processing control device of claim 1, further including:

task synchronization logic connected to each command decoder to control synchronization of plural threads.

7. The multiple-thread data processing control device of claim 1, wherein:

each command decoder is further responsive to a CPU_GO command to pass control of the corresponding one of said multiple threads to said primary control data processor.

* * * * *